(No Model.)
G. W. SMITH.
BALING PRESS.
No. 307,812. Patented Nov. 11, 1884.
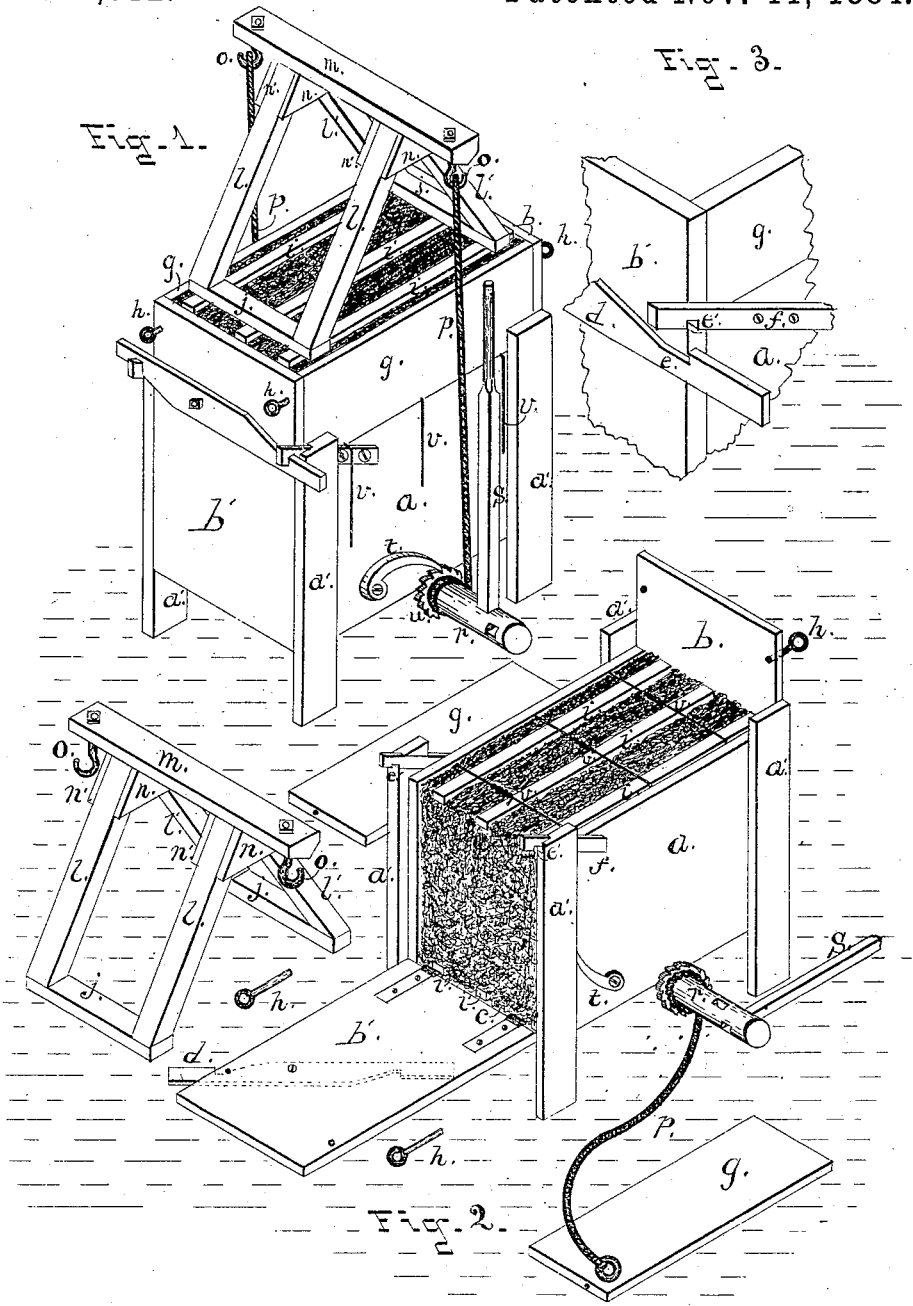
Attest:
G. P. Thomas
M. R. Thomas
Inventor:
George W. Smith
By James E. Thomas
Attorney

UNITED STATES PATENT OFFICE.

GEORGE W. SMITH, OF BAY CITY, MICHIGAN.

BALING-PRESS.

SPECIFICATION forming part of Letters Patent No. 307,812, dated November 11, 1884.

Application filed September 17, 1884. (No model.)

*To all whom it may concern:*

Be it known that I, GEORGE W. SMITH, a citizen of the United States, and a resident of Bay City, in the county of Bay and State of Michigan, have invented a new and useful Improvement in Baling-Presses, of which the following is a specification.

The object of my invention is to provide a baling-press that may be easily and cheaply made, and at the same time that can be operated easily and quickly.

The invention consists in the arrangement and combination of the different parts, as will be hereinafter more fully described and claimed, reference being had to the accompanying drawings, in which—

Figure 1 is a perspective view of my improved baling-press, showing the parts in position when just ready to press the contents into a bale. Fig. 2 is the same when the bale is ready to be removed. Fig. 3 is a detached view of the catch-bar, showing the notches and catches.

Similar letters refer to similar parts throughout the several views.

$a$ represents the sides of a case within which the material which is to be pressed into bales is placed, and $b$ is one end which is firmly secured to the bottom of the case as well as to the sides $a$, and extends considerably above the side pieces, $a$, the opposite end, $b'$, being attached to the bottom $c$ by hinges or other proper connection, so that the end piece, $b'$, may be let down, as shown in Fig. 2, to allow the bale to be easily removed or held in an upright position, as shown in Fig. 1, by a catch-bar, $d$. This catch-bar $d$ extends across the outside of and near its center is pivoted to the end piece, $b'$, and is provided near its outer ends with suitable hooks or notches, $e$, which are adapted to catch over the projecting catches $f$, which are properly secured to the side pieces, $a$, and projecting beyond the end of the side pieces, $a$, are also provided with a proper hook or notch, $e'$, adapted to catch over the bar $d$ and interlock with the notches $e$, and form a lock which will hold against a pressure in either direction and clamp the sides and end firmly together.

$g$ are movable side pieces which are placed directly above the side pieces, $a$, and are secured in position by the ring-bolts $h$, which pass through the end pieces, $b$ and $b'$, and into the ends of the movable sides $g$, and when the ring-bolts $h$ are withdrawn the movable side pieces, $g$, may be removed, as shown in Fig. 2.

When the case is filled with material to be packed into a bale, the pieces $i$ are placed directly upon the material and lengthwise of the case, similar pieces, $i'$, having been laid on the bottom of the case before the case was filled, and above and resting on the pieces $i$ is placed a follower, $k$, which consists of the pieces $j$, which extend across near the ends of the case and rest upon the pieces $i$.

Secured to the cross-pieces $j$ are the pieces $l$ and $l'$, and extending upward diagonally until they meet together are firmly secured at their upper ends to the cross-piece $m$, and are further braced and stiffened in their position by the blocks $n$ and $n'$, which are firmly secured to their sides. The upper cross-piece, $m$, extends on each side beyond the diagonal pieces $l$ and $l'$, and also beyond the line of the outside of the side pieces, $a$, and is provided near each end with the hooks $o$, which extend below the cross-piece $m$ and catch into a loop or ring in the rope or chain $p$.

Underneath and across near the middle of the case is placed in suitable bearings a roller, $r$, which projects beyond the sides of the case, and is provided at each end with suitable holes into which one or more levers, $s$, are placed for turning the roller, and suitably attached to the roller, and adapted to be wound thereon, is the chain or rope $p$. The opposite end is provided with a loop or ring which may be caught onto the hooks $o$.

On the roller $r$, and close to the side of the case, is placed the ratchet-wheel $u$, which is acted upon by the pawl $t$, which is pivoted to the sides $a$.

To operate, the hinged end $b'$ is closed, and the wires or cords $v$, which are designed to tie the bale, are placed across the bottom of the case with their ends projecting over the sides $a$. The bale-pieces $i'$ are placed lengthwise of the bottom, and the movable sides $g$ are put into position and secured by the ring-bolts $h$; then the hay or other material is put in, the bale-pieces $i$ are then placed on the hay and the follower $k$ is placed upon the bale-pieces $i$, the ropes $p$ are then caught on the hooks $o$, and the levers $s$ operated to rotate the roller $r$, which serves to draw down on the follower $k$ until the hay or other material is pressed below the removable sides $g$, when the pawl $t$, catching in the ratchet $u$, will hold the pressure, and the removable sides $g$ can be taken off, and the wires or cords $v$ are brought together and a twisted lock or tie formed, which holds the bale securely. The pawl $t$ is then disengaged from the ratchet $u$, and the catch-bar $d$ is disengaged from the catches $f$, and the hinged end $b'$ is let down, the follower $k$ taken off, as shown in Fig. 2, and the bale may be removed.

Horse or other power may be applied to perform the labor of pressing the bale, should it be desirable, by attaching the proper machinery to the roller $r$ and applying the power thereto; but

What I claim as my invention, and desire to secure by Letters Patent, is—

1. In a baling-press, the combination of the case composed of the rigid sides $a$ and rigid end $b$, the movable sides $g$, held in position by the ring-bolts $h$, and the hinged end $b'$, which is attached to the end of the bottom $c$, with a catch-bar, $d$, pivoted near its middle to the hinged end $b'$, and provided near its end with the notches $e$, and the catches $f$, which are attached to the side pieces, $a$, and projecting beyond the ends of the said side pieces, $a$, are provided with the notches $e'$, adapted to catch over the said bar $d$, while the notches $e$ catch over the said catches $f$ and form an interlocking clamp, substantially as and for the purpose set forth.

2. In a baling-press, a case composed of the rigid sides $a$, provided with the projecting catches $f$, the movable sides $g$, held in position by the ring-bolts $h$, and the hinged end $b'$, with a catch-bar, $d$, pivoted thereto and adapted to engage with the catches $f$, in combination with a follower, $k$, having the top cross-piece, $m$, the projecting ends of which are provided with the hooks $o$, the roller $r$, located below the case and projecting beyond each side of the said case, the ratchet $u$, the pawl $t$, and rope or chain $p$, one end of which is adapted to be wound on the roller $r$, while the opposite end is caught onto the said hooks $o$, substantially as described, and for the purpose set forth.

GEORGE W. SMITH.

Witnesses:
G. H. FRANCIS,
M. R. THOMAS.